United States Patent
Marupaduga

(10) Patent No.: US 11,683,841 B2
(45) Date of Patent: Jun. 20, 2023

(54) DYNAMIC CONTROL OF PRACH FORMAT BASED ON RRC-CONNECTION-ESTABLISHMENT-FAILURE HISTORY

(71) Applicant: Sprint Spectrum L.P., Overland Park, KS (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

(21) Appl. No.: 17/247,028

(22) Filed: Nov. 24, 2020

(65) Prior Publication Data
US 2022/0167421 A1 May 26, 2022

(51) Int. Cl.
*H04W 74/08* (2009.01)
*H04W 76/18* (2018.01)
*H04L 27/26* (2006.01)
*H04W 74/00* (2009.01)

(52) U.S. Cl.
CPC ..... *H04W 74/0833* (2013.01); *H04L 27/2607* (2013.01); *H04W 74/008* (2013.01); *H04W 76/18* (2018.02)

(58) Field of Classification Search
CPC ........... H04W 74/0833; H04W 74/008; H04W 74/08; H04W 74/006; H04W 74/0858; H04W 76/18; H04W 76/10; H04W 72/0473; H04W 72/04; H04W 72/1205; H04W 72/1252; H04W 28/02; H04W 28/0247; H04W 28/0284; H04W 92/10; H04L 27/2607; H04B 17/382
See application file for complete search history.

(56) References Cited

U.S. PATENT DOCUMENTS

| | | | |
|---|---|---|---|
| 6,775,252 B1 | 8/2004 | Bayley | |
| 8,249,611 B1 | 8/2012 | Sarkar et al. | |
| 9,294,950 B2 | 3/2016 | Futaki et al. | |
| 9,380,605 B1 | 6/2016 | Lee et al. | |
| 2011/0039499 A1* | 2/2011 | Zhang | H04W 74/0833 455/67.11 |
| 2014/0071930 A1 | 3/2014 | Lee et al. | |

(Continued)

OTHER PUBLICATIONS

International Search Report and Written Opinion from International Application No. PCT/US21/58817, dated Feb. 10, 2022.

*Primary Examiner* — Sudesh M Patidar
(74) *Attorney, Agent, or Firm* — McDonnell Boehnen Hulbert & Berghoff LLP

(57) ABSTRACT

A method and system for dynamically controlling random-access-request transmission in a cell provided by an access node, the access node supporting access attempts by user equipment devices (UEs). An example method includes (i) determining an extent to which the cell has experienced access blocks due to connection-request communication failure after successful random-access transmission and (ii) using the determined extent as a basis to dynamically set a physical random access channel (PRACH) format of the cell, wherein the PRACH format defines one or more configuration settings for random-access-request transmission by UEs in the cell and correlates with an effective radius of the cell.

16 Claims, 5 Drawing Sheets

DETERMINE AN EXTENT TO WHICH A CELL HAS EXPERIENCED ACCESS BLOCKS DUE TO CONNECTION-REQUEST COMMUNICATION FAILURE — 32

USE THE DETERMINED EXTENT AS A BASIS TO DYNAMICALLY SET A PRACH FORMAT OF THE CELL, THE PRACH FORMAT DEFINING ONE OR MORE CONFIGURATION SETTINGS FOR RANDOM-ACCESS TRANSMISSION BY UEs IN THE CELL AND CORRELATING WITH AN EFFECTIVE RADIUS OF THE CELL — 34

(56) References Cited

U.S. PATENT DOCUMENTS

| | | | |
|---|---|---|---|
| 2014/0148169 A1* | 5/2014 | Li | H04W 36/0061 |
| | | | 455/437 |
| 2014/0241285 A1* | 8/2014 | Pang | H04W 74/0833 |
| | | | 370/329 |
| 2015/0016312 A1 | 1/2015 | Li et al. | |
| 2015/0163829 A1* | 6/2015 | Li | H04W 74/0833 |
| | | | 370/329 |
| 2015/0173074 A1* | 6/2015 | Zhao | H04W 74/085 |
| | | | 370/336 |
| 2015/0304999 A1* | 10/2015 | Rune | H04W 4/70 |
| | | | 370/329 |
| 2015/0373740 A1* | 12/2015 | Eriksson | H04W 74/0833 |
| | | | 370/329 |
| 2017/0295596 A1* | 10/2017 | Chen | H04L 5/0053 |
| 2019/0159262 A1 | 5/2019 | Wang et al. | |
| 2019/0335397 A1* | 10/2019 | Ganesan | H04W 68/02 |
| 2020/0229242 A1* | 7/2020 | Xiong | H04W 74/008 |
| 2020/0252962 A1* | 8/2020 | Vajapeyam | H04W 72/085 |
| 2020/0267803 A1 | 8/2020 | Kwak et al. | |
| 2021/0051707 A1* | 2/2021 | Rastegardoost | H04W 72/14 |
| 2021/0195635 A1* | 6/2021 | Wändstedt | H04W 4/06 |
| 2021/0376946 A1* | 12/2021 | Zhang | H04L 27/2607 |

\* cited by examiner

DYNAMIC CONTROL OF PRACH FORMAT BASED ON RRC-CONNECTION-ESTABLISHMENT-FAILURE HISTORY

BACKGROUND

A typical wireless communication system includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), defining separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities. Further, each cell could have a physical cell identity (PCI) or the like that identifies the cell on the carrier, to help distinguish the cell from others cells that operate on the same carrier.

On the downlink and uplink, the air interface of each cell could be configured in a specific manner to define physical resources for carrying data (e.g., user-plane data and control-plane signaling) wirelessly between the access node and UEs.

Without limitation, for instance, the air interface of each cell could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), resource elements on the downlink and uplink respectively could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals, reference signals, system information, and other control signaling such as PRB-scheduling directives and acknowledgement messaging from the access node to UEs. And on the uplink, certain resource elements could be reserved to carry random-access signals and other control signaling such as PRB-scheduling requests, acknowledgement messaging, and channel-quality reports from UEs to the access node.

Overview

In example operation, when a UE enters into coverage of such a network, the UE could initially scan for and detect that a cell of an access node provides the strongest available coverage. And the UE could then engage in an access process in an effort to connect with the access node in that cell, i.e., the UE could engage in an access attempt.

In a typical access attempt, the UE could first engage in random-access signaling with the access node to get the access node's attention and to establish uplink transmission timing, and the UE could then engaging in Radio Resource Control (RRC) signaling with the access node to establish an air-interface connection (e.g., RRC connection) through which the access node will then serve the UE in the cell.

For instance, the UE could first transmit to the access node a random-access request (referred to as "Msg1"), and the access node could responsively transmit to the UE a random-access response (referred to as "Msg2") providing the UE with an initial uplink PRB grant that specifies allocated physical uplink shared channel (PUSCH) resources in which the UE could then transmit an RRC Connection Request. The UE could then transmit to the access node, in the allocated PUSCH resources, an RRC Connection Request (referred to as "Msg3"), and the access node could responsively transmit to the UE an RRC Connection Setup message (referred to as "Msg4"). And the UE could then responsively transmit to the access node an RRC Connection Setup Complete message, denoting completion of the RRC connection setup and thus completion of setup of an RRC connection for the UE.

Further, when the UE transmits to the access node the RRC Connection Request message (Msg3), before the access node then proceeds with sending to the UE an RRC Connection Setup message (Msg4), the access node and UE could engage in a hybrid automatic repeat request (HARQ) process to help ensure that the access node has successfully received the UE's RRC Connection Request message.

In a representative HARQ process, for instance, the access node could apply a cyclic redundancy check (CRC) to determine whether the access node successfully received the UE's RRC Connection Request message. And if so, the access node could then transmit to the UE a positive acknowledgement message (ACK) and then proceed with transmission to the UE of an RRC Connection Setup message. Whereas, if not, the access node could then instead transmit to the UE a negative acknowledgement message (NACK), in response to which the UE may then retransmit its RRC Connection Request to the access node, possibly with added error-correction data to help increase the likelihood of successful receipt.

In some implementations, a given cell could be pre-configured to allow up to just a limited maximum number of such RRC-Connection-Request transmissions per access attempt, with the maximum number possibly being on the order of 3 to 5. For instance, the access node that provides the cell could be pre-provisioned with this setting. And the access node could broadcast an indication of the setting, so that UEs seeking to connect with the access node in the cell could determine and comply with the setting. By way of example, the access node could broadcast in the cell a system information message that specifies this maximum number of RRC-Connection-Request transmissions per access attempt as a "maxHARQ-Msg3Tx" value.

When a UE engages in the access attempt in such a cell, if the UE engages in the maximum allowed number of RRC-Connection-Request transmissions without receiving an associated ACK from the access node, the UE and access node may both deem the UE's access attempt to have failed, defining an "access block". When that happens, the UE may then responsively abandon the access attempt and start over, again scanning for coverage (possibly for a next strongest cell) and attempting the access process again.

Unfortunately, however, such access blocks are undesirable, as they could create delay that could adversely impact user experience (if applicable) or cause other problems.

The present disclosure provides a mechanism that may help address this issue. The disclosure stems from a realization that a possible reason for unsuccessful RRC-connection establishment after successful random-access signaling is that the UEs at issue may be too far away from the access node. For instance, at a certain distance from the access node, due to differences in modulation, coding, or other aspects of communication, random-access signaling may succeed, but RRC-Connection-Request transmission may not.

One way to help address a scenario where an access node's cell tends to experience a relatively high extent of such access blocks is therefore to dynamically reduce the cell's effective radius, i.e., the effective maximum distance from the access node at which UEs could likely engage in successful random-access signaling with the access node. This effective cell-radius reduction can be accomplished by adjusting one or more operational settings for random-access signaling in the cell—with the operational setting(s) relating to the manner in which UEs modulate, encode, or otherwise structure their random-access signaling to the access node, and/or power levels at which UEs transmit their random-access signaling to the access node or other aspects of random-access signaling.

Under some RATs, an example operational-setting adjustment that could reduce the effective radius of the access node's cell is a change of the "PRACH format" (i.e., "preamble format") that the access node specifies for use by UEs seeking to acquire connectivity.

Under RATs such as 4G LTE or 5G NR, for instance, the UE transmits its random-access request (Msg1) to the access node by randomly selecting one of various possible random-access "preambles" and transmitting the selected random-access preamble on an uplink physical random-access channel (PRACH) to the access node. More particularly, the possible random-access preambles for this purpose could be generated using different cyclic shifts of a common Zadoff-Chu sequence, so that all of the preambles are uncorrelated with each other. And the UE's transmission of a random-access request could involve the UE transmitting on the PRACH, a cyclic prefix followed by a certain number of repetitions of the selected preamble sequence, followed by a guard period to allow time for the signal transmission and to help avoid having the transmission experience interference from subsequent uplink transmission.

A representative RAT may define various different possible "PRACH formats" that the access node could direct UEs to use for their random-access preamble transmissions. And the access node could broadcast in its cell a PRACH format index, such as a "prach-ConfigIndex" value, that indicates which of those PRACH formats UEs seeking to connect with the access node should use. For instance, the access node could broadcast this PRACH format index in the same system information broadcast message in which the access node broadcasts the maxHARQ-Msg3Tx value as noted above. A UE seeking to connect with the access node could then read that message to determine the indicated PRACH format and could accordingly use the indicated PRACH format in transmitting a random-access preamble to the access node.

These possible PRACH formats could differ from each other in various ways, such as by what cyclic-shift intervals should be used to establish the set of possible preamble sequences, how long the preamble sequences are, what cyclic-prefix length should be used for preamble transmission, how many preamble-sequence repetitions should be transmitted, and what guard period should be used. And one or more of these and/or other aspects of PRACH format could impact the effective radius of the access node's cell by impacting the effective maximum distance for successful preamble transmission. Without limitation, for instance, a longer cyclic-prefix length or longer guard period may contribute to providing a longer effective cell radius.

Given that PRACH format could correlate with effective cell radius, and given that reducing effective cell radius may help to address an observed high rate of access blocks in an access node's cell, the present disclosure provides for having the access node use the history of access blocks in its cell as a basis to dynamically control which PRACH format the access node will direct UEs to use in that cell.

By way of example, the access node could monitor the rate of access blocks that occur in its cell, perhaps over a recent sliding window of time. And the access node could correlate the monitored rate of access blocks to a PRACH format and then direct use of that PRACH format. For instance, the access node might refer to pre-provisioned mapping data that correlates different rates of access blocks respectively with different PRACH formats, to determine based on a most recent rate of access blocks what PRACH format the access node should direct UEs to use. Further, the access node might normally direct UEs to use a given PRACH format by default, and when the access node detects that a most recent rate of access is threshold high, the access node might change which PRACH format the access node directs UEs to use, perhaps switching from the default PRACH format to a PRACH format that would help provide a reduced effective cell radius.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system supporting 4G LTE or 5G NR. But it should be understood that the disclosed principles could extend to apply in other scenarios as well, such as with other RATs, and with other network configurations, among other possibilities. More generally, it should be understood that other changes from the specific arrangements and processes described are possible. For instance, various described entities, connections, operations, and other elements could be added, omitted, distributed, re-located, re-ordered, combined, or changed in other ways. In addition, various operations described as being performed by one or more entities could be implemented in various ways, such as by a processing unit executing instructions stored in non-transitory data storage, along with associated circuitry or other hardware, among other possibilities.

Figure 1:
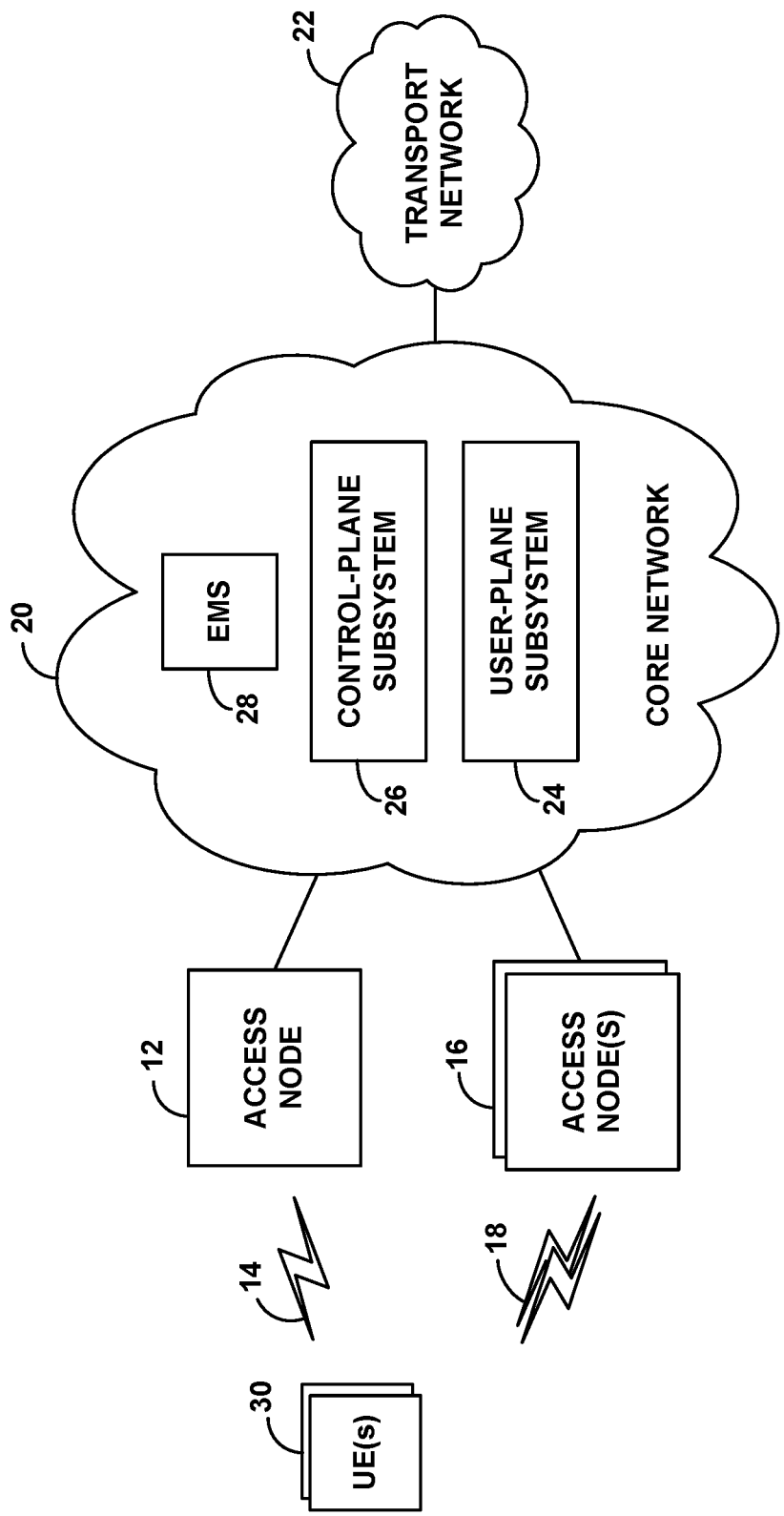
FIG. 1 is a simplified block diagram of an example network arrangement in which features of the present disclosure can be implemented.

Referring to the drawings, FIG. 1 is a simplified block diagram of an example network arrangement including a representative access node 12 configured to provide service on at least one cell 14, and including one or more other access nodes 16 each configured to provide service on a respective cell 18.

Each of these access nodes could take various forms. For instance, each access node could be a 4G LTE access node (e.g., evolved Node-B (eNB)) or 5G NR access node (e.g., next generation Node-B (gNB)), among other possibilities. Further, each access node could be a macro access node of the type configured to provide a wide range of coverage or could take other forms, such as a small cell access node, a relay, a femtocell access node, or the like, possibly configured to provide a smaller range of coverage.

Each access node's cell could defined on a respective carrier, which, as noted above, could be FDD or TDD and could be defined in a given frequency band, although multiple access nodes might operate on the same carrier as each other and provide different respective cells than each other. To provide coverage and service in such a cell, an access node could be equipped with a baseband unit, a radio head, and an antenna structure, among other components and logic.

The air interface of each such cell could be structured as described above by way of example, being divided over time into frames, subframes, and symbol time segments, and over frequency into subcarriers, thus defining an array of air-interface resource elements, which could be grouped and designated for particular use to carry data (including control-plane signaling and user-plane data) to or from served UEs. Though specifics could vary from RAT to RAT and/or based on other factors.

By way of example, on the downlink, certain resource elements per subframe could be generally reserved to define a physical downlink control channel (PDCCH) for carrying control signaling such as scheduling directives from the access node to served UEs, other resource elements per subframe could be generally reserved to define a physical HARQ channel (PHICH) for carrying acknowledgement signaling to served UEs, and other resource elements per subframe could be generally reserved to define a physical downlink shared channel (PDSCH) in which the resource elements could be grouped to define the PRBs noted above, allocable by the access node on an as needed basis to carry data communication from the access node to UEs.

Further, within these generally reserved groups of downlink resource elements, certain resource elements could be excluded and separately reserved for other use. For instance, certain resource elements could be reserved to carry synchronization signals that encode the cell's PCI and that UE's could detect as an indication of coverage and as a basis to establish frame timing. Further, other resource elements could be reserved to carry a cell-specific reference signal that UEs could evaluate in order to determine cell coverage strength, or synchronization signals could double as such a reference signal. Still further, certain resource elements could be reserved to carry system broadcast messages, such as a master information block (MIB) message and various system information block (SIB) messages.

Likewise, on the uplink, certain resource elements per subframe could be reserved to define an uplink control channel (PUCCH) for carrying control signaling such as scheduling requests from UEs to the access node, and other resource elements per subframe could be generally reserved to define a physical uplink shared channel (PUSCH) in which the resource elements could be grouped to define the PRBs noted above, allocable by the access node on an as needed basis to carry data communications from UEs to the access node.

And within these generally reserved groups of uplink resource elements, certain resource elements could similarly be excluded from the PUCCH and PUSCH and reserved for other use. For instance, certain resource elements could be reserved to define physical random access channel (PRACH) instances in which UEs could transmit random-access requests to the access node as discussed above. And other resource elements could be reserved to carry UE-specific uplink reference signals, such as sounding reference signals, which the access node could use as basis to evaluate uplink channel quality for instance.

In practice, each access node could be interfaced with a core network 20 that provides connectivity with an external transport network 22 such as the Internet for instance. Further, separate core networks might be provided specific purposes, such as one to support 4G service and another to support 5G service.

An example core network could be a packet-switched network that supports virtual-packet tunnels or other interfaces between network nodes. As shown in FIG. 1, the core network could include a user-plane subsystem 24 through which UE bearer communications could flow to and from the transport network 22, and a control-plane subsystem 26 supporting functions such as UE attachment, authentication, mobility management, and bearer management, among others. Further, the core network could include an element management system (EMS) 28, which could be a computing-system platform configured to operate as a central repository of operational data for the wireless communication network and to control and manage operation of various network elements.

FIG. 1 also illustrates a number of UEs 30 that may be within coverage of access node 12 from time to time and may seek to establish connectivity with access node 12 in cell 14. Each of these UEs could take any of the forms noted above among other possibilities.

In a representative implementation as discussed above, access node 12 could broadcast various operational parameters for receipt and use by these UEs, to govern aspects of how the UEs will work to establish connectivity with the access node. For present purposes, these operational parameters could include both (i) a prach-ConfigIndex value or the like that establishes the PRACH format to be used for random-access requests from UEs to the access node and (ii) a maxHARQ-Msg3Tx value or the like that establishes how many failed RRC-Connection-Request transmissions per access attempt it would take to constitute an access block.

The access node 12 could periodically broadcast each of these parameters, among others, in a SIB message in cell 14, particularly a "SIB2" message. And UEs that enter into coverage of cell 14 and discover coverage of the access node 12 in that cell could read that broadcast SIB message to determine the parameter values and could then operate accordingly.

As discussed above, for instance, when a UE first enters into coverage of the example network, the UE could initially scan for coverage and discover that coverage of cell 14 is the strongest available. For instance, the UE could scan various carriers in search of broadcast synchronization signals that would indicate the presence of coverage, and upon thereby detecting the presence of one or more cells, could then evaluate reference-signal strength per cell and select cell 14 as having the strongest reference-signal strength.

Having determined that cell 14 has the strongest available coverage, the UE could then read the SIB messages that access node 12 broadcasts in that cell 14, including SIB2, and could thereby determine both the prach-ConfigIndex and maxHARQ-Msg3Tx values specified by access node 12 for use in the cell. And applying these parameter values, the UE could then engage in an access attempt as discussed above, in an effort to connect with the access node that provides the cell.

In line with the discussion above, the UE could first transmit to access node 12 in cell 14 a random-access request, using the PRACH format indicated by the broadcast prach-ConfigIndex value. To facilitate this, the UE could be provisioned with logic that enables the UE to translate the broadcast prach-ConfigIndex to the configuration that the UE should use for random-access preamble transmission. For instance, the UE could be provisioned with data that maps each of various prach-ConfigIndex values respectively to a number of configuration settings such as (i) what cyclic-shift intervals should be used to establish the set of possible preamble sequences from which the UE would randomly select a preamble sequence, (ii) what cyclic-prefix length the UE should use for preamble transmission, (iii) how many preamble-sequence repetitions the UE should transmit, and (iv) what guard period will follow the preamble transmission(s).

Applying the indicated PRACH format, the UE could thus transmit a random-access request message (Msg1) to the access node 12 in a PRACH instance of cell 14. This random-access request message would not identify the UE but would rather simply function to notify the access node 12 that a UE is seeking to gain access.

Upon receipt of this random-access request message from the UE, the access node could then transmit to the UE a random-access response message (Msg2) that provides the UE with an initial grant of uplink PRB(s) for use by the UE to transmit an RRC Connection Request (Msg3) to the access node. And the UE could then transmit to the access node in the initially allocated PRBs the RRC Connection Request, in which the UE could provide the UE's actual identity among other information. Upon receipt of this RRC Connection Request, the access node could then assign to the UE a Cell Radio Network Temporary Identifier (C-RNTI) that will uniquely identify the UE's RRC connection, and the access node could establish in data storage a context record for the RRC connection. Further, the access node could transmit to the UE an RRC Connection Setup message (Msg4) providing the assigned C-RNTI. And the UE could then transmit to the access node an RRC Setup Complete message denoting completion of setup of an RRC connection for the UE.

As noted above, various aspects of the PRACH format specified by the access node could impact what the effective radius of cell 14 is, in terms of how far away from the access node 12 a UE could be for the UE's random-access request message transmission to successfully reach the access node 12. Given this effective cell radius, if the UE at issue happens to be too far away from the access node, the UE's random-access-request transmission to the access node may fail, and the UE could detect this failure by detecting that the UE does not receive from the access node an associated random-access response message.

In accordance with additional configuration settings that might also be specified by the access node's broadcast SIB2 message, the UE may then attempt re-transmission of its access-request message up to a maximum allowed number of times, perhaps incrementing its transmission power by a specified power increment for each subsequent attempt. But still, if the UE is located beyond the effective cell radius of cell 14, the UE's random-access request message transmission may not successfully reach the access node, and so the UE may not be able to establish connectivity in cell 14. In that case, the UE may then ultimately seek to connect instead in a second strongest cell, such as one of cells 18.

On the other hand, if the UE's random-access request transmission in cell 14 successfully reaches the access node 12 (with one or more transmission attempts) and the access node then responds to the UE, the UE could then proceed to transmit its RRC Connection Request message to the access node 12. And as noted above, the UE and access node could engage in a HARQ process to help ensure that the access node successfully receives the UE's RRC Connection Request message.

In a representative HARQ process as discussed above, for instance, the UE could provide with its RRC Connection Request message (e.g., in a message header) a CRC value that the UE computes based on the data of the message. And if the access node receives a transmission from the UE in the initially granted uplink PRBs, the access node could then correspondingly compute a CRC based on data of the received transmission and determine whether its computed CRC matches the CRC provided by the UE.

If the access node determines that the CRC matches, then the access node could conclude that the UE's RRC-Connection-Request transmission was successful and could responsively transmit to the UE an ACK and then proceed with processing of the RRC Connection Request and transmission to the UE of an RRC Connection Setup message. Whereas, if the access node does not receive the scheduled transmission from the UE or receives the transmission and determines that the CRC does not match, then the access node could conclude that the UE's RRC-Connection-Request transmission was not successful and could responsively transmit to the UE a NACK, in response to which the UE could engage in re-transmission of its RRC Connection Request message to the access node, possibly with added error-correction coding as noted above.

As indicated above, if the UE has engaged in the maxHARQ-Msg3Tx number of RRC-Connection-Request message transmissions as part of an access attempt and, through those transmissions, the access node does not successfully receive the UE's RRC Connection Request, the UE and access node could deem the UE's access attempt to have failed—as an access block. Further, as noted above, the UE could then responsively start over again, possibly attempting access instead in a next strongest cell, such as one of cells 18.

Per the present disclosure, a computing system could keep track of the rate of such access blocks experienced by cell 14 (i.e., as to UE(s) attempting to acquire connectivity in the cell) and could use the tracked rate of the cell's access blocks as a basis to control the PRACH-format setting of the cell. The computing system that carries out this process could be provided at various locations, two examples of which are (i) at the access node that provides the cell and (ii) at the EMS 28.

In an example implementation, the computing system could keep a record of access blocks experienced by the cell. This could be a record of individual instances of the cell experiencing access block based on failed RRC-Connection-Request transmission. And/or this could be statistical data representing an extent of such instances. For instance, the record could indicate a most recent (current) access-block rate of the cell, perhaps as a rolling average quantity of such access blocks experienced by the cell per unit time over a recent sliding window of time. Further or alternatively, the record could indicate various representative access-block rates of the cell on a per time-of-day basis (e.g., any calendar basis), to support a prediction of what the cell's likely access-block rate is at a current time of day in view of what the cell's access-block is typically at that time of day. Other examples are possible as well.

If the computing system is at the access node 12 that provides the cell 14, e.g., provided by a host processor of the access node, the computing system could identify and track instances of access blocks in the cell. Each such instance could be where the access node has ultimately failed to successfully receive a UE's RRC Connection Request in a given access attempt, notwithstanding the UE engaging in the cell's maxHARQ-Msg3Tx number of RRC-Connection-Request transmissions for the access attempt. The computing system at the access node could thus keep the record of such access blocks as noted above.

Whereas, if the computing system is at the EMS 28, the computing system could receive reports of such access blocks from the access node 12 that provides the cell 14. For example, each time the cell experiences such an access block, the access node could report that fact to the EMS 28, or the access node 12 could periodically report to the EMS 28 rolled up records of such access blocks since a last report.

The computing system could then use this tracked access-block data for the cell 14 as a basis to dynamically configure the cell's PRACH format setting, e.g., to establish a particular prach-ConfigIndex value that access node 12 will broadcast in cell 14 for use by UEs that will seek to acquire connectivity in the cell. For instance, the computing system could monitor the cell's access-block rate, as an actual most recently determined access-block rate or as an access-block rate predicted by or for the computing system based on historical access-block data as noted above. And the computing system could map the cell's access-block rate to a particular prach-ConfigIndex value.

In line with the discussion above, a goal of this process could be to dynamically adjust the effective radius of the cell 14 in view of the observed rate of access-blocks in the cell. For instance, if and when the cell's rate of access blocks is relatively high, the process could dynamically configure for the cell a PRACH format that correlates with a relatively short effective cell radius, so as to help prevent relatively distant UEs from succeeding with random-access-request transmission and thus to help reduce the likelihood of access blocks involving those UEs. Whereas, if and when the cell's rate of access blocks is relatively low, the process could dynamically configure for the cell a PRACH format that correlates with a relatively long effective cell radius, so as to allow relatively distant UEs to gain access. Alternatively, the process could be carried out for other reasons.

Choosing a PRACH format, with associated prach-ConfigIndex value, to configure the effective radius of the cell in view of the observed rate of access-blocks of the cell, could take various forms depending on the available PRACH formats, which could vary from RAT to RAT or based on other factors.

Without limitation, in a 5G NR system, an example choice could be between standard PRACH formats "B3" and "B4". PRACH format B4 has a greater number of preamble-sequence repetitions than PRACH format B3 and also has a longer guard period than PRACH format B3. For these and/or other reasons, PRACH format B4 likely correlates with a longer effective cell radius than PRACH format B3. Therefore, in an example implementation, if and when the access-block rate of cell 14 is relatively high, the computing system could configure use of PRACH format B3 in the cell, to help provide a relatively short effective cell radius. Whereas, if and when the access-block rate of cell 14 is relatively low, the computing system could instead configure use of PRACH format B4 in the cell, to allow for a relatively longer cell radius.

The computing system could carry out this dynamic configuration of PRACH format of the cell in various ways.

As noted above, for instance, the computing system could include or have access to mapping data that correlates various access-block rates (e.g., ranges of such rates) with associated PRACH formats, such as associated prach-ConfigIndex values. This mapping data could be established by engineering input and/or through automated means. The computing system could thus refer to this mapping data to determine, based on a cell's access-block rate, what the cell's prach-ConfigIndex setting should be. And the computing system could then accordingly configure the cell's prach-ConfigIndex setting (e.g., cause the cell's prach-ConfigIndex setting to be so configured).

Alternatively or additionally, as noted above, the cell's prach-ConfigIndex value could be set to a default value that correlates with a given effective cell radius, and the computing system could use the cell's access-block rate as a basis to adjust the cell's prach-ConfigIndex value so as to adjust the cell's effective radius. For instance, the computing system could determine whether the cell's access-block rate is at least as high as a predefined threshold level, which could also be set by engineering input or in other ways. And in response to determining that the cell's access-block rate is at least as high as the predefined threshold level, the computing system could adjust the cell's prach-ConfigIndex value to a value that would likely correlate with a shorter effective cell radius.

If the computing system is at access node 12, the computing system could directly set the cell's prach-ConfigIndex value by recording it at the access node and reconfiguring the SIB2 message that the access node broadcasts, so that the SIB2 message will specify the determined prach-ConfigIndex value, and UEs could receive and operate according to that setting. Alternatively, if the computing system is at the EMS 28, the computing system could set the cell's prach-ConfigIndex by transmitting to the access node a signaling message to which the access node is configured to respond by so setting the cell's prach-ConfigIndex value.

Further, this process could then continue iteratively. If or when the cell's access-block rate changes sufficiently, the computing system could accordingly adjust the cell's prach-ConfigIndex value to dynamically adjust the cell's effective radius.

Figure 2:
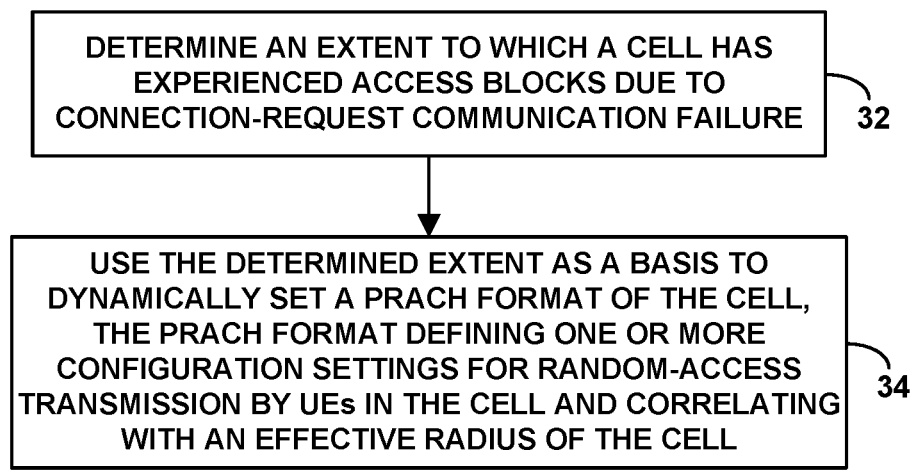
FIG. 2 is a flow chart depicting a method that could be carried out in accordance with the disclosure.

FIG. 2 is next a flow chart depicting a method that could be carried out in accordance with the present disclosure, to dynamically control random-access-request transmission in a cell of a wireless communication system. As shown in FIG. 2, at block 32, the method includes determining an extent to which the cell has experienced access blocks due to connection-request communication failure (e.g., RRC Connection Request communication failure). And at block 34, the method includes using the determined extent as a basis to dynamically set a PRACH format of the cell, the PRACH format defining one or more configuration settings for random-access transmission by UEs in the cell and correlating with an effective radius of the cell.

In line with the discussion above, the cell could be provided by an access node, and the access node could support access attempts by UEs, each access attempt by a UE respectively including (i) the UE engaging in random access signaling with the access node and (ii) the UE then engaging in up to the maximum allowed number of connection-request transmissions to the access node in an effort to ensure successful receipt by the access node of a connection request from the UE. Further, as noted above, an access block could be deemed to have occurred each time the access node does not successfully receive connection-request transmission from the UE through the maximum allowed number connection-request transmissions by the UE.

In addition, as discussed above, the act of the UE engaging in up to the maximum allowed number of connection-request transmissions to the access node could be a HARQ process. And the maximum allowed number of connection-request transmissions per access attempt in the cell could be defined by a maxHARQ-Msg3Tx value.

Further, as noted above, the PRACH format of the cell could define one or more configuration settings for random-access-request transmission by UEs in the cell, such as (i) what cyclic-shift intervals should be used to establish a set of possible preamble sequences from which to randomly select a preamble sequence, (ii) what cyclic-prefix length should be used for transmission of the randomly selected preamble sequence, (iii) how many preamble-sequence repetitions should be included in the random-access-request transmission, and (iv) what guard period should follow the number of repetitions of the randomly selected preamble sequence.

As discussed above, the act of using the determined extent as a basis to dynamically set the PRACH format of the cell could involve (i) determining, by referring to mapping data that maps various extents of access blocks respectively to associated PRACH formats, a PRACH format corresponding with the determined extent and (ii) based on the determining of the PRACH format, setting the PRACH format of the cell to be the determined PRACH format.

Further, the mapping data could map progressively higher extents of access blocks respectively to PRACH formats that correlate with progressively shorter effective cell radii. For instance, the mapping data could map a first extent of access blocks to PRACH format B4 that correlates with a first effective cell radius, and the mapping data could map a second extent of access blocks to PRACH format B3 that correlates with a second effective cell radius, the second extent being greater than the first extent, and the second effective cell radius being shorter than the first effective cell radius.

Still further, the cell could be set with a default PRACH format that correlates with a first effective cell radius. And in that case, the act of using the determined extent as a basis to dynamically set the PRACH format of the cell could involve (i) determining that the determined extent is at least as high as a predefined threshold extent and (ii) responsive to at least the determining that the determined extent is at least as high as a predefined threshold extent, adjusting the PRACH format of the cell to a modified PRACH format that correlates with a second effective cell radius that is shorter than the first effective cell radius.

In addition, as noted above, the determined extent to which the cell has experienced the access blocks could be a rate of access blocks experienced in the cell. And determining the extent to which the cell has experienced the access blocks could involve (i) tracking occurrences of the access blocks in the cell over time and determining the extent as a most recent extent and/or (ii) tracking occurrences of the access blocks in the cell on a per time of day basis to facilitate a prediction of an extent of access blocks in the cell.

Yet further, as discussed above, the cell could be provided by an access node, and the method could be carried out by the access node. Or the cell could be provided by an access node, and the method could be carried out by a computing system external to the access node, in which case using the determined extent as a basis to dynamically set PRACH format of the cell could involve (i) the computing system using the determined extent as a basis to determine the PRACH format and (ii) the computing system transmitting to the access node a control signal specifying the determined PRACH format, the control signal being interpretable by the access node to cause the access node to set the PRACH format.

And still further, as discussed above, the cell could be provided by an access node, and the act of setting the PRACH format of the cell could involve setting the PRACH format at the access node, where the access node broadcasts a control signal (e.g., SIB2) that specifies the PRACH format, as a prach-ConfigIndex for instance, to enable UEs to learn from the control signal the specified PRACH format and to therefore use the specified PRACH format when attempting to gain access in the cell.

Figure 3:
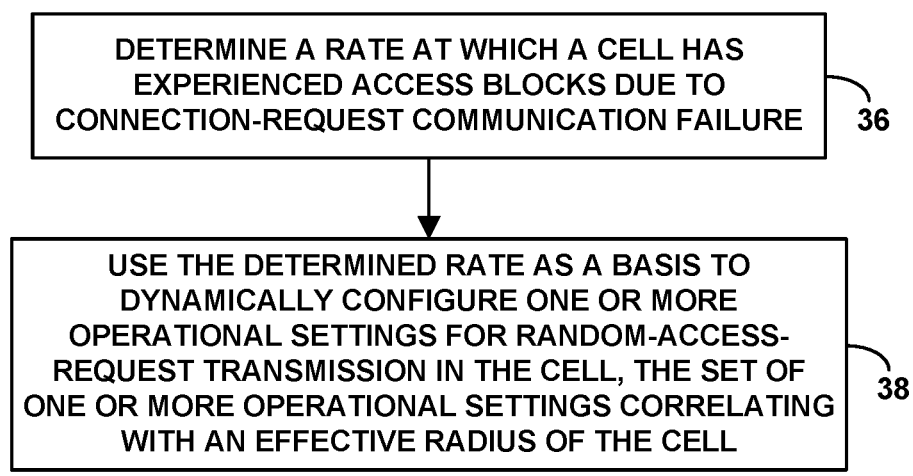
FIG. 3 is another flow chart depicting a method that could be carried out in accordance with the disclosure.

FIG. 3 is next another flow chart depicting a method that could be carried out in accordance with the present disclosure, to dynamically control random-access-request transmission in a cell of a wireless communication system. As shown in FIG. 3, at block 36, the method includes determining a rate at which the cell has experienced access blocks due to connection-request communication failure (e.g., RRC Connection Request communication failure). And at block 38, the method includes using the determined rate as a basis to dynamically configure a set of one or more operational settings (e.g., a PRACH format) for random-access-request transmission in the cell, wherein the set of one or more operational settings correlates with an effective radius of the cell.

Figure 4:
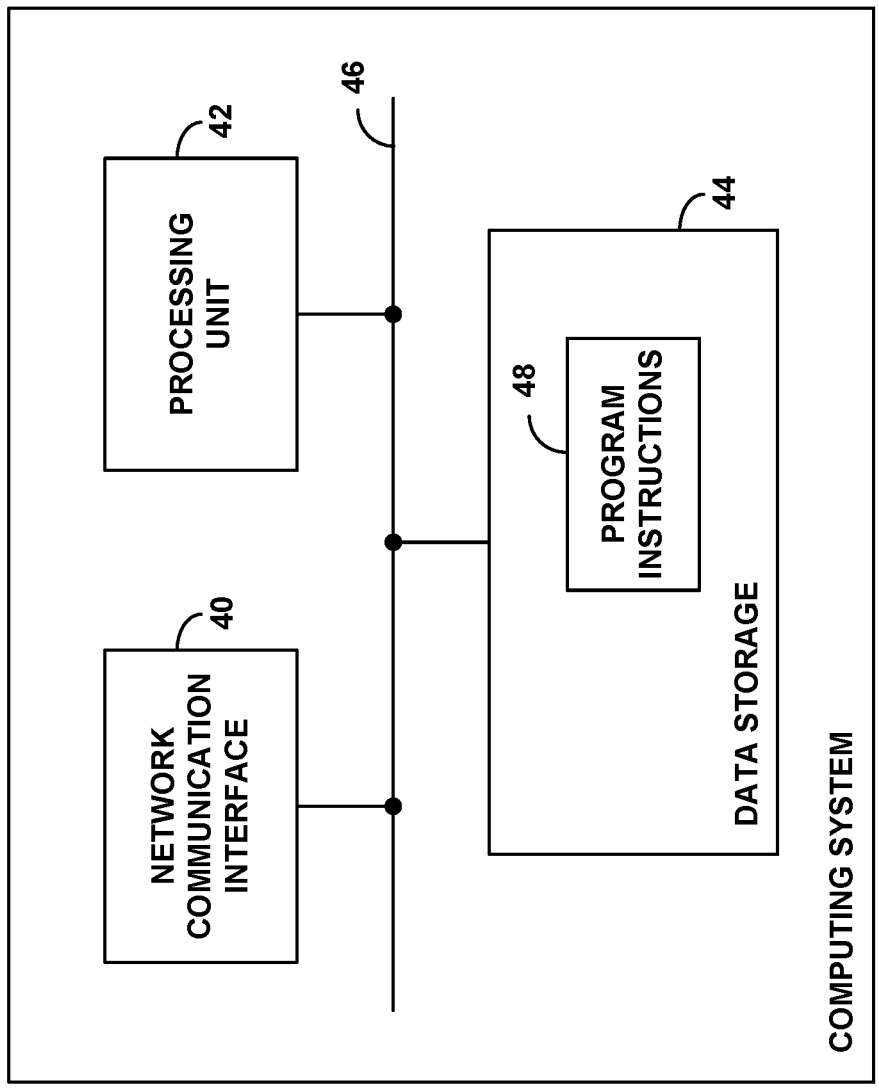
FIG. 4 is a simplified block diagram of an example computing system operable in accordance with the disclosure.

FIG. 4 is next a simplified block diagram of an example computing system that could be operable to control random-access request transmission in a cell of a wireless communication system. As noted above, the cell could be provided by an access node, and the computing system could be provided at the access node and/or at an entity external to the access node such as at an EMS, among other possibilities.

As shown in FIG. 4, the example computing system includes a network communication interface 40, a processing unit 42, and non-transitory data storage 44, all of which could be integrated together and/or interconnected by a system bus, network, or other connection mechanism 46.

The network communication interface 40 could comprise a physical network connector and associated communication logic (e.g., protocol stacks) to facilitate network communication with various other entities. The processing unit 42 could comprise one or more processors, such as one or more general purpose processors (e.g., microprocessors) and/or one or more special-purpose processors (e.g., application specific integrated circuits). And the non-transitory data storage 44 could comprise one or more volatile and/or non-volatile storage components (e.g., magnetic, optical, or flash storage, necessarily non-transitory).

As shown, the data storage 44 could then store program instructions 48, which could be executable by the processing unit 42 to cause the computing system to carry out various operations described herein, such as the operations depicted and described with respect to FIG. 2 and/or FIG. 3 for instance.

Various other features described herein can be implemented in this context as well, and vice versa.

Figure 5:
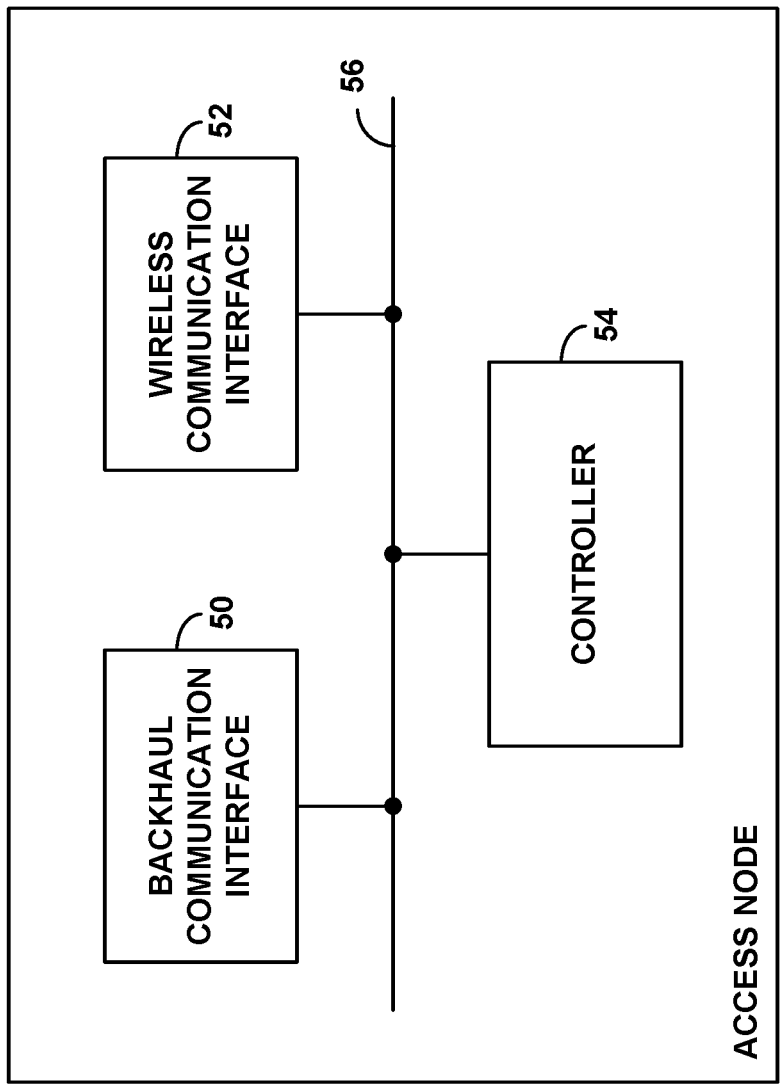
FIG. 5 is a simplified block diagram of an example access node operable in accordance with the disclosure.

FIG. 5 is next a simplified block diagram of an example access node that could operate in a wireless communication system such as that noted above for example, to carry out various features described herein. As shown in FIG. 5, the example access node includes a backhaul communication interface 50, a wireless communication interface 52, and a controller 54, all of which could be integrated together and/or communicatively linked together by a system bus, network, or other connection mechanism 56.

In an example implementation, the backhaul communication interface 50 could comprise a wired or wireless interface, such as an Ethernet network communication interface, configured to support backhaul communication on a core network. And the wireless communication interface 52 could comprise an antenna structure, which could be tower mounted or could take other forms, and associated components such as a power amplifier and a wireless transceiver, so as to facilitate providing a cell defining an air interface and engaging air-interface communication on the air interface in accordance with an applicable RAT.

Further, the controller 54 (which might be provided by a baseband unit of the access node, for instance) could comprise one or more processors (e.g., one or more general purpose processors and/or specialized processors) programmed to cause the access node to carry out various operations such as those discussed herein, including for example the operations of FIG. 2 and/or FIG. 3.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for dynamically controlling random-access-request transmission in a cell of a wireless communication system, the method comprising:
    determining an extent to which the cell has experienced access blocks due to connection-request communication failure; and
    using the determined extent as a basis to dynamically set a physical random access channel (PRACH) format of the cell, wherein the PRACH format defines one or more configuration settings for random-access-request transmission by user equipment devices (UEs) in the cell and correlates with an effective radius of the cell, and wherein using the determined extent as a basis to dynamically set the PRACH format of the cell comprises (i) determining, by referring to mapping data that maps various extents of access blocks respectively to associated PRACH formats, a PRACH format corresponding with the determined extent and (ii) based on the determining of the PRACH format, setting the PRACH format of the cell to be the determined PRACH format,
    wherein the mapping data maps progressively higher extents of access blocks respectively to PRACH formats that correlate with progressively shorter effective cell radii.

2. The method of claim 1, wherein the cell is provided by an access node, wherein the access node supports access attempts by UEs, each access attempt by a UE respectively including (i) the UE engaging in random access signaling with the access node and (ii) the UE then engaging in up to a maximum allowed number of connection-request transmissions to the access node in an effort to ensure successful receipt by the access node of a connection request from the UE, wherein an access block occurs when the access node does not successfully receive connection-request transmission from the UE through the maximum allowed number connection-request transmissions by the UE.

3. The method of claim 1, wherein the one or more configuration settings comprise at least one configuration setting selected from the group consisting of:
    (i) cyclic-shift interval to be used for establishing a set of preamble sequences from which to randomly select a preamble sequence to be transmitted,
    (ii) cyclic-prefix length to be used for transmission of the randomly selected preamble sequence, (iii) number of repetitions of the randomly selected preamble sequence to include in the random-access-request transmission, and (iv) guard period to follow the number of repetitions of the randomly selected preamble sequence.

4. The method of claim 1, wherein the mapping data maps a first extent of access blocks to PRACH format B4 that correlates with a first effective cell radius, and the mapping data maps a second extent of access blocks to PRACH format B3 that correlates with a second effective cell radius, the second extent being greater than the first extent, and the second effective cell radius being shorter than the first effective cell radius.

5. The method of claim 1, wherein the cell is set with default PRACH format that correlates with a first effective cell radius, and wherein using the determined extent as a basis to dynamically set the PRACH format of the cell comprises:

determining that the determined extent is at least as high as a predefined threshold extent; and responsive to at least the determining that the determined extent is at least as high as the predefined threshold extent, adjusting the PRACH format of the cell from the default PRACH format to a modified PRACH format that correlates with a second effective cell radius that is shorter than the first effective cell radius.

6. The method of claim 1, wherein the determined extent to which the cell has experienced the access blocks is a rate of access blocks experienced in the cell.

7. The method of claim 1, wherein determining the extent to which the cell has experienced the access blocks comprises an action selected from the group consisting of (i) tracking occurrences of the access blocks in the cell over time and determining the extent as a most recent extent and (ii) tracking occurrences of the access blocks in the cell on a per time of day basis to facilitate a prediction of an extent of access blocks in the cell.

8. The method of claim 1, wherein the cell is provided by an access node, and wherein the method is carried out by the access node.

9. The method of claim 1, wherein the cell is provided by an access node, and wherein the method is carried out by a computing system external to the access node, wherein using the determined extent as a basis to dynamically set the PRACH format of the cell comprises the computing system using the determined extent as a basis to determine the PRACH format, and the computing system transmitting to the access node a control signal specifying the determined PRACH format, the control signal being interpretable by the access node to cause the access node to set the PRACH format.

10. The method of claim 1, wherein the cell is provided by an access node, and wherein setting the PRACH format of the cell comprises setting the PRACH format at the access node, wherein the access node broadcasts a control signal that specifies the set PRACH format.

11. The method of claim 10, wherein the control signal specifies the set PRACH format as a prach-ConfigIndex parameter value.

12. A method for dynamically controlling random-access-request transmission in a cell of a wireless communication system, the method comprising:

determining a rate at which the cell has experienced access blocks due to connection-request communication failure; and using the determined rate as a basis to dynamically configure a set of one or more operational settings for random-access-request transmission in the cell, wherein the set of one or more operational settings correlates with an effective radius of the cell, and wherein using the determined rate as a basis to dynamically set a physical random access channel (PRACH) format of the cell comprises (i) determining, by referring to mapping data that maps various rates of access blocks respectively to associated PRACH formats, a PRACH format corresponding with the determined rate and (ii) based on the determining of the PRACH format, setting the PRACH format of the cell to be the determined PRACH format, wherein the mapping data maps progressively higher rates of access blocks respectively to PRACH formats that correlate with progressively shorter effective cell radii.

13. A computing system operable to control random-access-request transmission in a cell of a wireless communication system, the computing system comprising:

a processing unit;

non-transitory data storage; and program instructions stored in the non-transitory data storage and executable by the processing unit to carry out operations including:

determining an extent to which the cell has experienced access blocks due to connection-request communication failure; and using the determined extent as a basis to dynamically set a physical random access channel (PRACH) format of the cell, wherein the PRACH format defines one or more configuration settings for random-access-request transmission by user equipment devices (UEs) in the cell and correlates with an effective radius of the cell, and wherein using the determined extent as a basis to dynamically set the PRACH format of the cell comprises (i) determining, by referring to mapping data that maps various extents of access blocks respectively to associated PRACH formats, a PRACH format corresponding with the determined extent and (ii) based on the determining of the PRACH format, setting the PRACH format of the cell to be the determined PRACH format, wherein the mapping data maps progressively higher extents of access blocks respectively to PRACH formats that correlate with progressively shorter effective cell radii.

14. The computing system of claim 13, wherein the cell is provided by an access node, wherein the access node supports access attempts by user equipment devices (UEs), each access attempt by a UE respectively including (i) the UE engaging in random access signaling with the access node and (ii) the UE then engaging in up to a maximum allowed number of connection-request transmissions to the access node in an effort to ensure successful receipt by the access node of a connection request from the UE, wherein an access block occurs if the access node does not successfully receive connection-request transmission from the UE through the maximum allowed number connection-request transmissions by the UE.

15. The computing system of claim 14, wherein the computing system is provided at the access node.

16. The computing system of claim 13, wherein the cell is set with default PRACH format that correlates with a first effective cell radius, and wherein using the determined extent as a basis to dynamically set the PRACH format of the cell comprises:

determining that the determined extent is at least as high as a predefined threshold extent; and responsive to at least the determining that the determined extent is at least as high as the predefined threshold extent, adjusting the PRACH format of the cell from the default PRACH format to a modified PRACH format that correlates with a second effective cell radius that is shorter than the first effective cell radius.

* * * * *